US008934877B2

(12) United States Patent
Toksvig et al.

(10) Patent No.: US 8,934,877 B2
(45) Date of Patent: Jan. 13, 2015

(54) INFERENTIAL URGENCY NOTIFICATION DELIVERY CHANNEL

(75) Inventors: Michael John McKenzie Toksvig, Palo Alto, CA (US); David Harry Garcia, Sunnyvale, CA (US); Eglia Nair Flores, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 154 days.

(21) Appl. No.: 13/277,121

(22) Filed: Oct. 19, 2011

(65) Prior Publication Data

US 2013/0102287 A1 Apr. 25, 2013

(51) Int. Cl.
H04W 4/02 (2009.01)
H04W 4/22 (2009.01)
H04W 76/00 (2009.01)

(52) U.S. Cl.
CPC .............. H04W 4/22 (2013.01); H04W 76/007 (2013.01)
USPC ................... 455/414.1; 455/412.2; 455/414.2; 455/414.3; 455/414.4; 455/422.1

(58) Field of Classification Search
USPC ........... 455/414.1–414.4, 412.1–412.2, 422.1
See application file for complete search history.

(56) References Cited

U.S. PATENT DOCUMENTS

| 5,787,162 | A * | 7/1998 | Javitt ............................ 379/229 |
| 6,650,746 | B1 | 11/2003 | Green |
| 6,653,930 | B1 | 11/2003 | Bonomo |
| 6,977,994 | B2 | 12/2005 | Stephenson |
| 7,284,077 | B2 | 10/2007 | Duncan |
| 8,077,019 | B2 * | 12/2011 | Hofmann et al. .......... 340/407.1 |
| 2005/0063523 | A1 | 3/2005 | Jupe |
| 2006/0240803 | A1 | 10/2006 | Valeriano |
| 2007/0147399 | A1 | 6/2007 | Deng |
| 2009/0063467 | A1 | 3/2009 | Abhyanker |
| 2009/0210497 | A1 | 8/2009 | Callanan |
| 2009/0252303 | A1 | 10/2009 | Agarwal |
| 2010/0318613 | A1 | 12/2010 | Souza |
| 2011/0003578 | A1 | 1/2011 | Chen |
| 2011/0014932 | A1 | 1/2011 | Estevez |
| 2011/0117875 | A1 | 5/2011 | Oh |

(Continued)

FOREIGN PATENT DOCUMENTS

KR 10-2007-0010313 A 1/2007

OTHER PUBLICATIONS

PCT International Search Report for International Appl No. PCT/US2013/057412, Mar. 4, 2013.

(Continued)

*Primary Examiner* — Michael T Vu
(74) *Attorney, Agent, or Firm* — Baker Botts L.L.P.

(57) ABSTRACT

In one embodiment, a first computing device communicating with a second computing device through a communications channel transmits an out-of-band message indicative of the urgency of the communication through a notification channel. In particular embodiments, a server acts as a proxy for relaying the out-of-band message from the first device to the second device. The second device calculates an implicit urgency score based on the communication characteristics, and combines the implicit score with the explicit urgency indicator to determine whether a call is urgent. In particular embodiments, the server calculates an implicit urgency score based on a number of factors, and the score is composited with the overall urgency score. In particular embodiments, communication handling may be affected by the determination of urgency.

15 Claims, 8 Drawing Sheets

(56) References Cited

U.S. PATENT DOCUMENTS

| | | |
|---|---|---|
| 2011/0117880 A1 | 5/2011 | Li |
| 2012/0083240 A1 | 4/2012 | Patel |
| 2012/0149342 A1* | 6/2012 | Cohen et al. ............... 455/412.2 |
| 2012/0191777 A1 | 7/2012 | Iwasaki |
| 2012/0221638 A1 | 8/2012 | Edamadaka |
| 2012/0323928 A1 | 12/2012 | Bhatia |

OTHER PUBLICATIONS

Shin, K. et al., "Most-Urgent—First Protocol for Real-Time Wireless Channels in a Digital Cellular/PCN Environment," Proc. of the Fifth ITS America Annual Meeting, 1995.

* cited by examiner

INFERENTIAL URGENCY NOTIFICATION DELIVERY CHANNEL

TECHNICAL FIELD

This disclosure generally relates to transmitting data via an intermediate host disposed logically between two client devices concurrently with a communication from the first client device to the second client device through a different channel. The transmission through the server notifies the user of the second client device of the urgency of the communication.

BACKGROUND

When two electronic devices are connected to a network (e.g., a computer or communication network), data may be transmitted between the two devices over the network using one or more suitable network protocols. For example, in a client-server environment, data may be transmitted between a server and a client over a network to which both the server and the client are connected. Of course, a network may include any number of sub-networks. By transmitting data between the two devices, the two devices may communicate with each other.

Mobile devices such as mobile phones, tablets, and personal computers often communicate through wireless networks provided by cellular carriers. Modern 3G and 4G networks, both CMDA2000-based and GPRS-based, permit simultaneous access of wireless data through the packet-switched portion of its wireless cellular network and voice data through the circuit-switched portion of its wireless cellular network. Additionally, modern wireless cellular networks permit simultaneous communication through the packet-switched data portion of their networks and through their short message service (SMS) channels.

SUMMARY

This disclosure generally relates to transmitting data between two wireless client devices via an intermediate host in order to notify the second client device of the urgency of a concurrent incoming communication from the first client device.

In particular embodiments, a software client on the calling client device displays an interface to the user of the first client device to explicitly place a call high urgency. Upon selecting a high urgency call, an indicator is transmitted to the called device via the packet-switched portion of each device's wireless cellular network and a server. In particular embodiments, the urgency indicator may be transmitted via the SMS channel directly from the calling device to the called device via their respective cellular networks. In particular embodiments, the urgency indicator may be transmitted over the packet network to an intermediate server, which in turn delivers the urgency indicator over the SMS channel via an short-message point-to-protocol bind. In particular embodiments, the calling device may transmit the urgency indicator to an intermediate server by transmitting an SMS message to a common short code (CSC) application residing on the server, which may then transmit the urgency indicator via SMS or the packet-switched data network. The called device receives the indicator substantially concurrently with the circuit-switched voice call from the calling device to the called device, alerting the user of the called device that the incoming call is urgent.

In particular embodiments, software residing at the server or at the client device implicitly determines whether a call is high urgency. In particular embodiments, the location of the calling device, the frequency and time of the call, and other social factors are utilized to determine whether the communication is urgent.

In particular embodiments, the urgency indicator is transmitted via an alternative, out-of-band notification channel, such as a TCP/IP connection from the server to each client device. In particular embodiments, the urgency indicator appears on all incoming communications, including voicemails, missed calls, and text messages.

These and other features, aspects, and advantages of the disclosure are described in more detail below in the detailed description and in conjunction with the following figures.

DESCRIPTION OF EXAMPLE EMBODIMENTS

Figure 1:
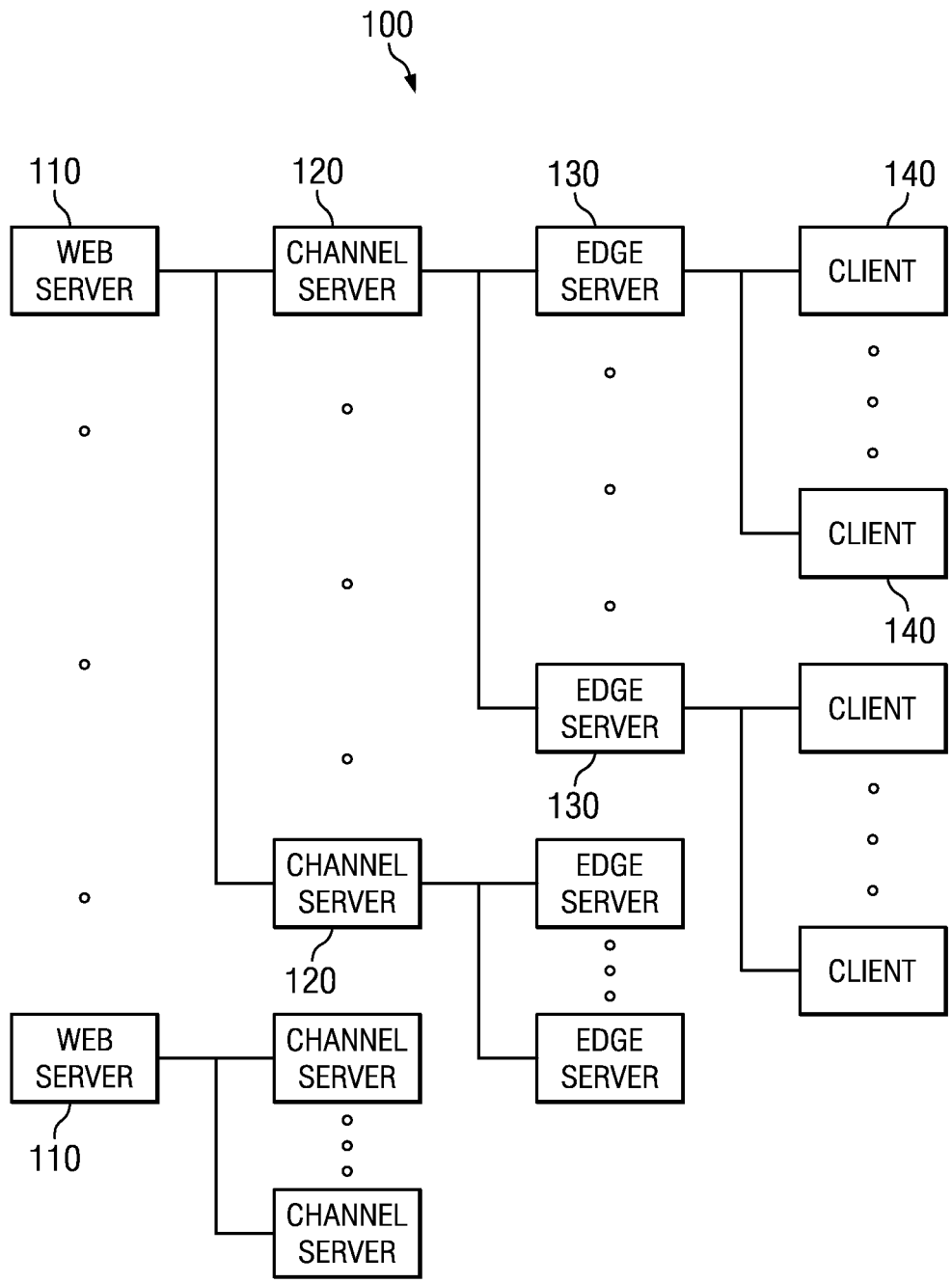
FIG. 1 illustrates an example client-server environment.

This disclosure is now described in detail with reference to a few embodiments thereof as illustrated in the accompanying drawings. In the following description, numerous specific details are set forth in order to provide a thorough understanding of this disclosure. However, this disclosure may be practiced without some or all of these specific details. In other instances, well known process steps and/or structures have not been described in detail in order not to unnecessarily obscure this disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

In network communications, one device may "push" a communication to another device. In particular embodiments, with push technology, the sending device typically initiates the communication transaction and may transmit the communication to the receiving device without obtaining a permission from the receiving device first. In other words, the communication is "pushed" to the receiving device whether or not the receiving device actually wants to receive the communication.

Push technology may be used under various circumstances. For example, in a client-server environment, a server may push communications to a client. The client may be any type of electronic device capable of network communications. In particular embodiments, the client may be a mobile device (e.g., a mobile telephone, a smart phone, a tablet computer, etc.) capable of wireless communications, and the server may push communications, sent over a mobile network or a wireless network, to the mobile client. Alternatively or in addition, in particular embodiments, the client may be a non-mobile computing device (e.g., a desktop computer) capable of connecting to a computer network through a wired connection (e.g., an Ethernet connection). The server may push communications to the non-mobile client over the computer network (e.g., the Internet).

In particular embodiments, a social-networking system implemented, for example, as a social-networking website, may push communications to the client devices of its users. A social network, in general, is a social structure made up of entities, such as individuals or organizations, that are connected by one or more types of interdependency or relationships, such as friendship, kinship, common interest, financial exchange, dislike, or relationships of beliefs, knowledge, or prestige. In more recent years, social networks have taken advantage of the Internet. There are social-networking systems existing on the Internet in the form of social-networking websites. Such social-networking websites enable their members, who are commonly referred to as website users, to perform various social activities. For example, the social-networking website operated by Facebook, Inc. at www.facebook.com enables its users to communicate with their friends via emails, instant messages, or blog postings, organize social events, share photos, receive news of their friends or interesting events, play games, etc.

In order to maintain connectivity with its users, a social networking system may maintain a constant open connection with each of the mobile devices associated with a particular user account. This open data connection allows the social networking system to push notifications to client devices, the client devices to request content from the social networking system, and the client devices to transmit information back to the social networking system servers. For example, a client device may wish to constantly update the social networking system of its location. As another example, the client device may wish to perform some sort of action on the social network, and may request, through HTTP or another suitable protocol, a web page for performing the specific action. In other cases, the social networking system may wish to push a notification of a message from one social networking user to another. In particular embodiments, this open data connection utilizes a TCP/IP connection. In particular embodiments, the open data connection utilizes a VPN tunnel, such as in Microsoft Direct Push. In particular embodiments, the open data connection utilizes the SMS channels for push notifications. This disclosure contemplates any suitable manner of maintaining an open connection for unidirectional or bidirectional communication between a social networking system and a client device.

In particular embodiments, the social networking system may implicitly determine that a communication is high urgency based on a number of different factors. This disclosure contemplates any relevant factor. In particular embodiments, given a specific user, the urgency of the incoming communication from such a user may be inferred, based on, without limitation, the current time (e.g., morning vs. afternoon vs. evening, or weekdays vs. weekends), the current location of the user (e.g., work vs. home, restaurant, shops, theater, etc.), which may be derived from the GPS coordinates or the communication signals of the user's device or the Internet Protocol (IP) address of the user's device, the current activity of the user (e.g., in a meeting, making a phone call, eating lunch or dinner, watching a movie, etc.). The urgency may also be inferred based on the user's social information or social activities between the transmitting user and the receiving user. For example, a social coefficient between two users may be utilized by the social networking system to determine whether a communication from one user to another is likely to be urgent. In particular embodiments, the calling user's location relative to another user or connected node may be utilized to infer urgency. For example, if a user receives a call from a contact on the social network who is physically located within a predetermined proximity from several of the user's other first-degree contacts, the social networking system may infer that the call is of higher urgency.

FIG. 1 illustrates an example client-server environment 100 in which a communication may be received from or pushed to a client device. In particular embodiments, the client device may be a mobile device associated with a user. There may be any number of servers 110, 120, 130 of various types and any number of clients 140 of various types. Each server 110, 120, or 130 may include hardware, software, or embedded logic components or a combination of two or more such components for carrying out the appropriate functionalities implemented or supported by server 110, 120, or 130. In particular embodiments, servers 110, 120, and 130 may be arranged in tiers. For example, there may be one or more web servers 110 for hosting a social-networking website. Each web server 110 may be connected with one or more channel servers 120. Each channel server 120 may be connected with one or more edge servers 130. Web servers 110, channel servers 120, and edge servers 130 may each perform some of the functionalities or operations supported by the social-networking website. For example, web servers 110 may host a network application or a web-based application, such as a social-networking application or website. Channel servers 120 may monitor and manage the available communication channels (e.g., media downloading or uploading, instant messaging, posting, emailing, chatting, presence, etc.) for the users of the application hosted by web servers 110. Edge servers 130 may maintain network or communication connections with user devices (e.g., clients 140) for messaging and other accesses. In addition, edge servers 130 may function as proxies for web servers 110. Clients 140 may communicate with web servers 110 through edge servers 130. In particular embodiments, servers 110, 120, and 130 and clients 140 may each have a unique identifier. For example, each server 110, 120, and 130 may be identified by its unique IP address, and each client 140 may be identified by its unique device identifier.

By using multiple servers, the workload of the social-networking website may be shared and balanced among the multiple servers and thus, the performance of the social-networking website may be improved. For example, the social-networking website may have hundreds of millions of users around the world, and at any given time, a great number of these users may be connected to the website through their respective user devices. New users may continually join the website as well. These users may be shared and balanced among multiple channel servers 120 to be serviced. In particular embodiments, a hash algorithm may be applied to the user identifier (e.g., the username or account number) of each user to determine to which channel server 120 a specific user is assigned. In addition or alternatively, channel servers 120 may be placed at different physical locations around the world, and a user may be assigned to a channel server 120 that is relatively close (e.g., in terms of physical distance) to the user's device. For example, a user located in Japan may be assigned to a channel server 120 located in Japan or China; while a user located in England may be assigned to a channel server 120 located in France.

In particular embodiments, each client 140 may be associated with a user as a user device. Each client 140 may be a mobile or non-mobile device and connected to a network wirelessly or through a wired connection. In particular embodiments, when a user connects with the social-networking website through his/her client 140 (i.e., the user device), client 140 may establish one or more connections with an edge server 130. Each connection may be a TCP/IP connection. More specifically, client 140 may be connected with an edge server 130 that is connected to the channel server 120 to which the user of client 140 is assigned.

Figure 2:
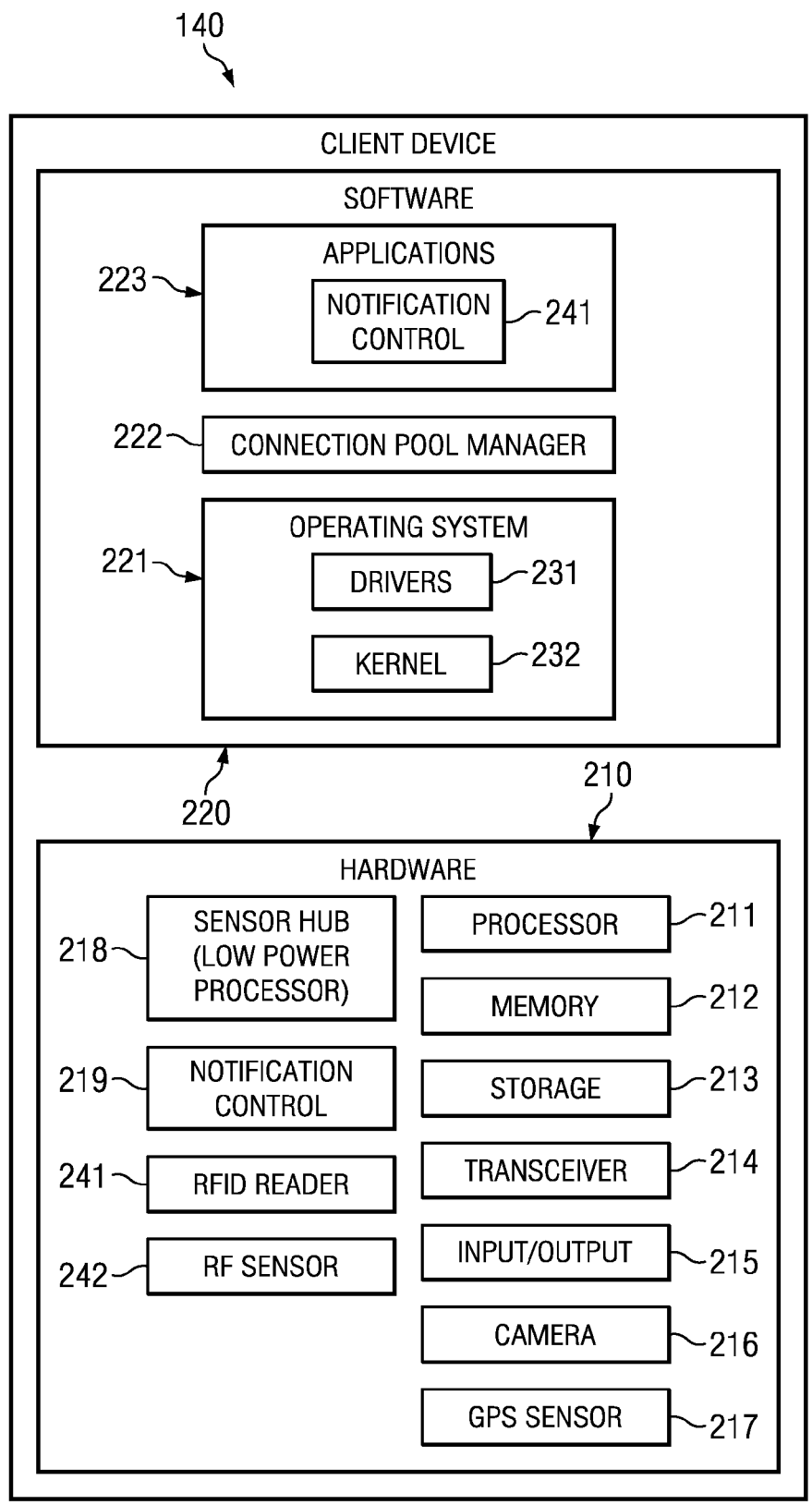
FIG. 2 illustrates an example user device.

FIG. 2 illustrates an example client device 140. In particular embodiments, a client 140 may include hardware, firmware, and software. In particular embodiments, client device 140 may be a smart phone (e.g., iPhone, Android-based phone, or Blackberry), which is a mobile telephone that offers more advanced computing ability and connectivity than a traditional mobile phone. It may be considered as a handheld computer integrated with a mobile phone. In particular embodiments, client device 140 may be a netbook or tablet computer (e.g., iPad, Android-based tablets). Client device 140 may be connected to a network through a wireless connection, such as a GSM or CDMA2000-based wireless cellular network.

In particular embodiments, client device 140 may include hardware 210 and software 220. In particular embodiments, hardware 210 may include any number of hardware components such as, for example and without limitation, processor 211, memory 212, storage 213, transceiver 214, input/output device 215 (e.g., display, touch screen, keypad, microphone, speaker, etc.), camera 216, global positioning system (GPS) sensor 217, sensors hub 218, notification control switch 219, RFID reader 241, RF sensor 242, and so on. In particular embodiments, hardware 210 may include wireless display (WiDi) transceivers, bluetooth low-energy (BLE) transceivers, near-field communications (NFC) transceivers, 802.11 WiFi and 802.16 WiMax transceivers, and the like. This disclosure contemplates any suitable hardware components. In particular embodiments, location determination may be performed by the social networking system even when mobile device 140 does not perform or share any self-determined position information. For example, the social networking system may maintain a physical map f all WiFi networks, and determine the location of client device 140 from its IP address. This disclosure contemplates any suitable manner of determining the location of client device 140. In particular embodiments, some or all of a user's user data may be stored in storage 213.

In particular embodiments, software 220 may include an operating system 221, which may include a kernel 231 and/or any number of device drivers 232 corresponding to some of the hardware components available on client device 140. Operating system 221 may be selected for client device 140 based on the actual type of device client device 140 is. For example, if client device 140 is a mobile device (e.g., a smart phone), then operating system 221 may be a mobile operating system such as, for example and without limitation, Microsoft's Windows Mobile, Google's Android, Nokia's Symbian, Apple's iOS, and Samsung's Bada.

In particular embodiments, there may be a connection pool manager 222 residing and executing on client device 140, which may be implemented as computer software. In particular embodiments, one or more software applications 223 may be executed on client device 140. In particular embodiments, they may be native applications installed and residing on client device 140. For example, one application (e.g., Google Maps) may enable a device user to view a map, search for addresses and businesses, and get directions; a second application may enable the device user to read, send, and receive emails; a third application (e.g., a web browser) may enable the device user to browse and search the Internet; a fourth application may enable the device user to take photos or record videos using camera 216; a fifth application may allow the device user to receive and initiate VoIP and/or cellular network calls, and so on. In particular embodiments, there may be a software application (e.g., notification control 241) that enables the device user to manage the notifications pushed to client device 140. Each software application 220 may have a user interface and may implement one or more specific functionalities. Each software application 220 may include one or more software modules implementing the individual functionalities. The executable code of software applications 220, including notification control 241, may be stored in a computer-readable and non-transitory medium (e.g., storage 213 or memory 212) on client device 140.

Figure 3:
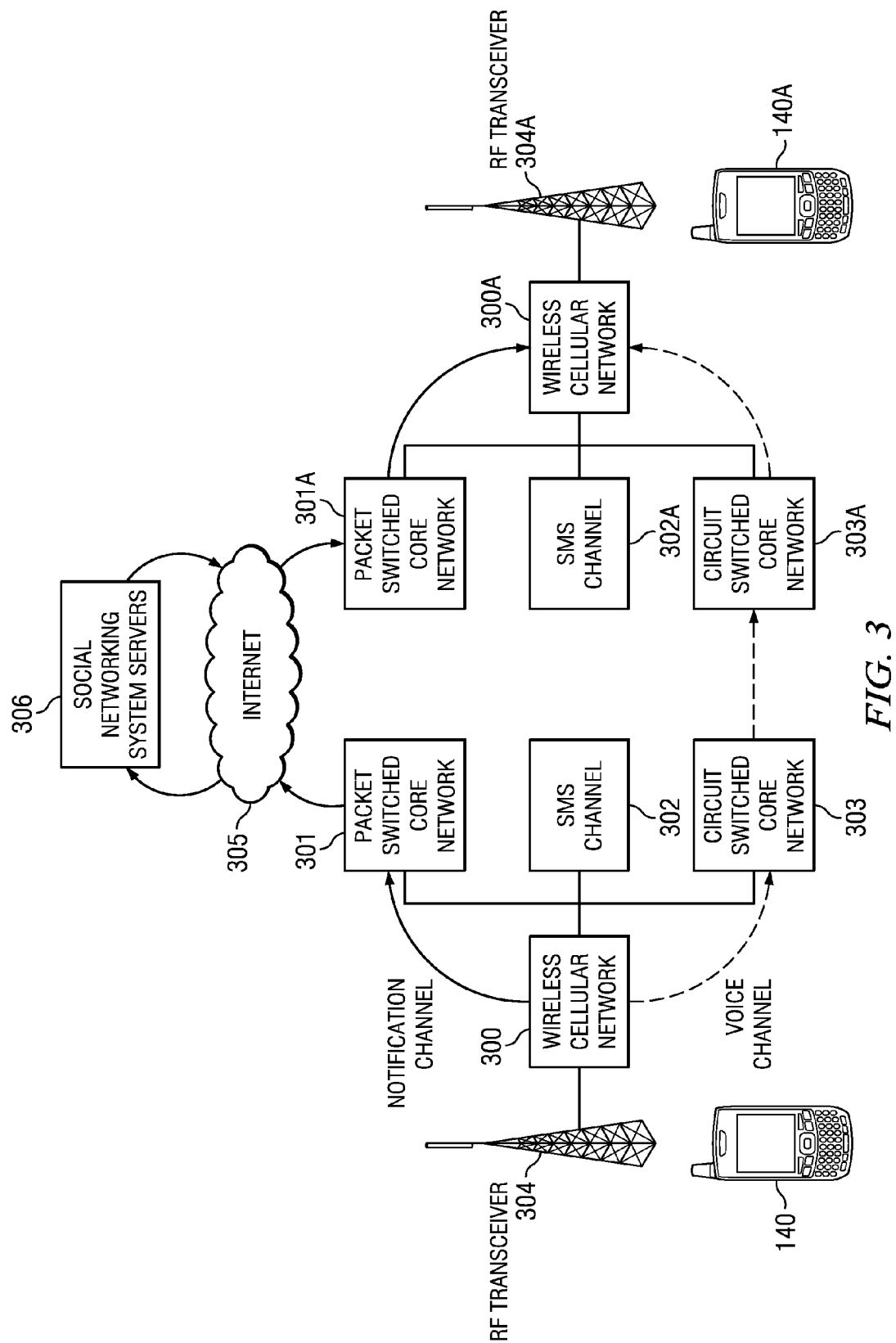
FIG. 3 illustrates an example dual-channel connection for mobile devices utilizing wireless cellular networks.

FIG. 3 illustrates an example first mobile device initiating a communication to a second mobile device through separate communication channels. In FIG. 3, client device 140 and 140A are both associated with specific user accounts of a social networking system, hosted on social networking system servers 306. Social networking servers 306 may include web servers 110, channel servers 120, and edge servers 130, as previously described with reference to FIG. 1. Client devices 140 and 140A may be connected to the same or different ones of web, channel, and edge servers 110, 120, and 130, respectively.

Social networking system servers 306 maintain a notification channel (depicted as the solid line in FIG. 3) with both mobile device 140 and 140A. As previously discussed, the notification channel may be a persistent TCP/IP connection, VPN tunnel, or any other suitable persistent data connection. The notifications channel between servers 306 and mobile device 140 maintains a connection through Internet 305 and the packet-switched (data) core network 301 of mobile device 140's wireless cellular network 300. From wireless cellular network 300, the data is transmitted to RF transceiver 304 (the cell tower, base station, Node B, and the like) that is servicing mobile device 140. Similarly the notification channel between social networking servers 306 and mobile device 140A maintains a connection through Internet 305 and packet-switched (data) core network 301A in mobile device 140A's wireless cellular network 300A. Wireless cellular networks 300 and 300A may be disparate wireless cellular networks, or where mobile devices 140 and 140A are serviced by the same carrier, a single wireless cellular network.

As previously discussed, notification channel may be a persistent TCP/IP connection, and mobile devices 140 and 140A may periodically send keepalive messages to severs 306. In particular embodiments, mobile devices 140 and 140A adjust the keepalive interval based upon an adaptive algorithm. In particular embodiments, keepalive messages are transmitted at a pre-set interval. In particular embodiments, keepalive messages may be transmitted from the server to the handsets. In particular embodiments, the notification channel utilizes the packet-switched data network for upstream data, such as HTTP requests or uploads from mobile devices 140 and 140A, and SMS channels 302 and 302A for pushing notifications to mobile devices 140 and 140A. This disclosure contemplates any suitable method of establishing and maintaining a persistent data connection between servers 306 and mobile devices 140 and 140A.

In the example of FIG. 3, the user at mobile device 140 wishes to place a voice call to the user at mobile device 140A. Traditional voice calls in modern wireless networks traverse the circuit-switched core networks 303 and 303A of wireless cellular networks 300 and 300A. The voice communication from the first mobile device 140 to the second mobile device 140A is depicted as a dashed line in FIG. 3. In particular embodiments, when the user of mobile device 140 wishes to place a call to mobile device 140A at high urgency, mobile device 140 simultaneously transmits an urgency indicator, a message containing and indication of the urgency of the call, via the notification channel to social networking servers 306. Social networking servers 306 then transmits the urgency indicator via the notification channel to mobile device 140A. Thus, the user of mobile device 140A receives the urgency indicator substantially concurrently with the voice call over the voice channel, and may better assess whether to answer or decline the call. In particular embodiments, the urgency indicator is transmitted from the transmitting mobile device 140 to the social networking servers 306 for every call regardless of the presence of an explicit urgency selection by the transmitting user. In particular embodiments, the urgency indicator also applies to voicemails left by a high-urgency call. For example, if the user of the second mobile device 140A misses an urgent call from a user of mobile device 140, and the user of mobile device 140 leaves a voicemail in the voicemail box of mobile device 140A, mobile device 140A will still have received the urgency indicator, and mobile device 140A will display to the user that he or she missed an urgent call and has a voicemail in his or her voicemail box marked as "urgent."

Although FIG. 3 depicts an out-of-band urgency indicator transmitted simultaneously to a voice call, the urgency indicator may be transmitted in conjunction with any other type of communication from mobile device 140 to mobile device 140A (or vice versa). For example, in particular embodiments, a text message, whether SMS or MMS, email, or instant message, may also be marked as urgent. In such an example, mobile device 140 transmits the urgency indicator through the notification channel to servers 306, which in turn transmit the urgency indicator to mobile device 140A via the notification channel. Thus, mobile device 140A displays an indicator or icon on its display that an urgent text message was received. In particular embodiments, the indicator may be an audible indicator, such as a different ring tone. In particular embodiments, the communication may also be transmitted through the data networks 301 and 301A and Internet 305. For example, mobile device 140 may transmit an instant message through a third-party instant messaging server, such as AOL IM, Google Talk, BlackBerry Messenger (BBM), Kik messenger, or the like. Provided that these services do not provide a mechanism to specify the urgency of a given message, mobile device 140 may transmit an urgency indicator through the out-of-band (i.e., separate from the channel through which the message was sent) notification channel so that the user of mobile device 140A is alerted to the urgency of the incoming instant message. In particular embodiments, voice calls may also be transmitted through the packet networks 301 and 301A as VoIP calls. In such an embodiment, mobile devices 140 and 140A maintain at least two internet connection channels, the notification channel, and the communication channel (generally between a third-party VoIP server such as Google Voice, Skype, or the like). Mobile device 140 transmits the urgency indicator through notification channel to servers 306 for forwarding to mobile device 140A in exactly the same manner as if the communication channel were through circuit-switched core networks 303 and 303A. This disclosure contemplates all forms of communications channels, including but not limited to traditional voice calls, SMS messages, MMS messages, push-to-talk (PTT), video calls (such as Google HangOut, Tango, Skype, and the like), instant messages, electronic mail, and VoIP for use in conjunction with the transmission of an urgency indicator over an out-of-band notification channel.

While FIG. 3 describes a communication between two mobile devices, one or both of the devices may be wired devices. For example, a user may be utilizing a VoIP software program to initiate a communication with another user, and may transmit urgency information via a separate HTTP or HTTPS connection to the social networking system so that an urgency indicator appears on the called party's device. This disclosure contemplates any suitable hardware or software configuration for transmitting a communication through a first communication channel and a communication describing the first communication through an out-of-band second communication channel.

Figure 4:
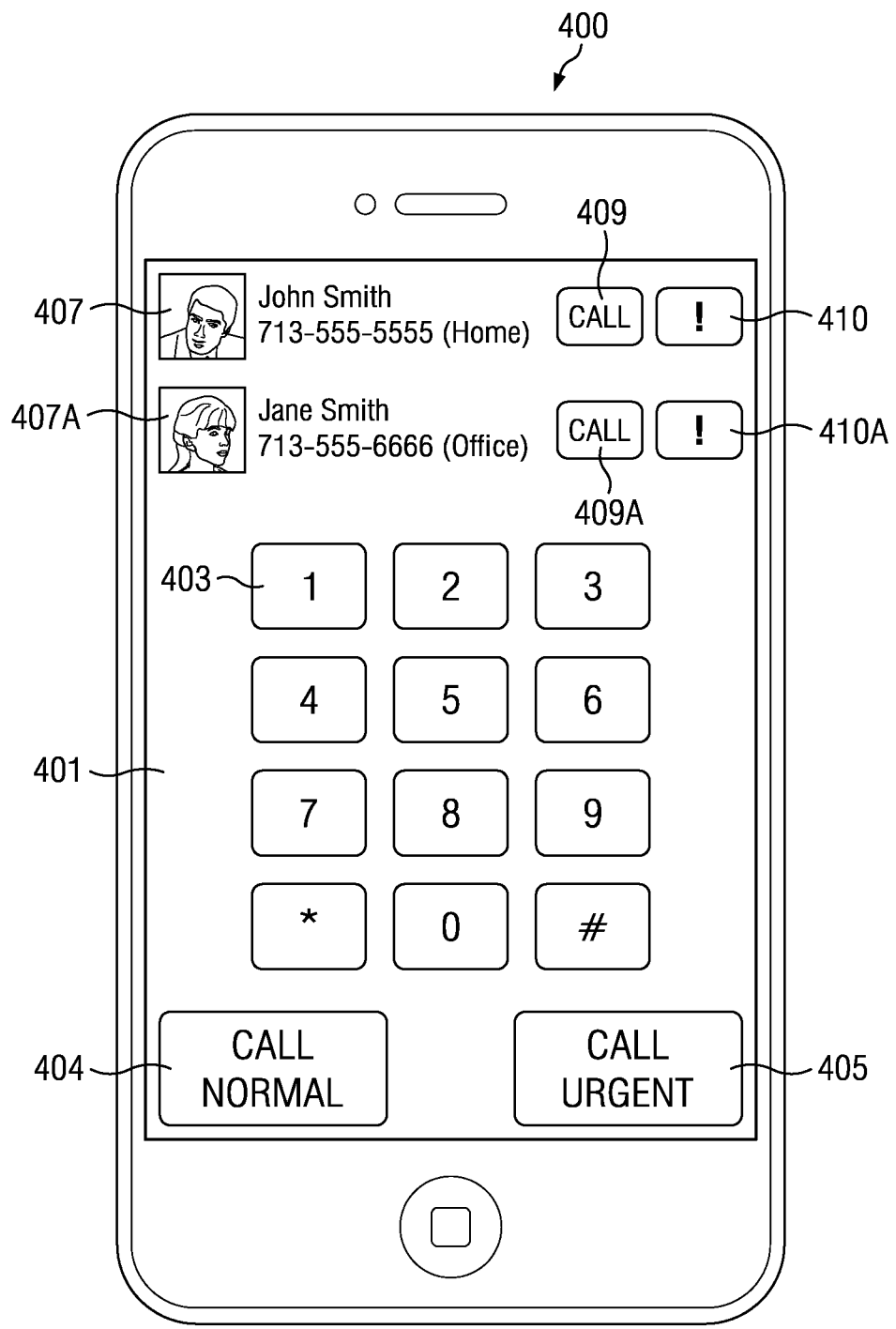
FIG. 4 illustrates an example interface for initiating a high urgency communication.

Whether a communication is marked as "urgent" may be based on explicit designations by the transmitting mobile device, or, in particular embodiments, implicit determinations from a variety of factors by the social networking system or by the receiving mobile device. FIG. 4 illustrates an example mobile device 400 having a user interface 401 on its display for explicitly designating a call as "urgent." User interface 401 includes keypad 403, where a user of mobile device 400 may enter in a phone number for the called party. Upon entering the phone number, the user may select user interface element 404 to initiate a normal call, or user interface element 405 to initiate an urgent call.

Alternatively, in particular embodiments, mobile device 400 may display on user interface 401 a set of icons 407 and 407A representing the most frequently called contacts, the last incoming or outgoing calls, or a listing of contacts in any other suitable ordering. A user may select user interface elements 408 and 408A next to each contact name to place a normal call for the contact, or user interface element 409 and 409A to place an urgent call for the contact. Although FIG. 4 depicts two distinct graphical user interface elements for placing an urgent call, this disclosure contemplates any suitable method of marking a communication as urgent. For example, a graphical user interface element similar to user interface element 409 may be displayed next to the "send" key for text-based communications such as email, instant message, and text message. In particular embodiments, a user may initiate an urgent communication through an audible or voice command; for example, the user may simply press the voice command button and say, "urgent call Contact X." In particular embodiments, additional user interface controls may be provided to the user, permitting the user to specify the method of delivering the notification to the user, such as via SMS, MMS, voicemail, push notification, email, etc, and, in particular embodiments, the frequency of such notifications. For example, an extremely urgent calling party may specify to redundantly transmit the urgency indicator for a voicemail across all communications channels every minute until the called party listens to the voicemail. This disclosure contemplates any suitable method of marking a communication as urgent or initiating an urgent communication.

Figure 5:
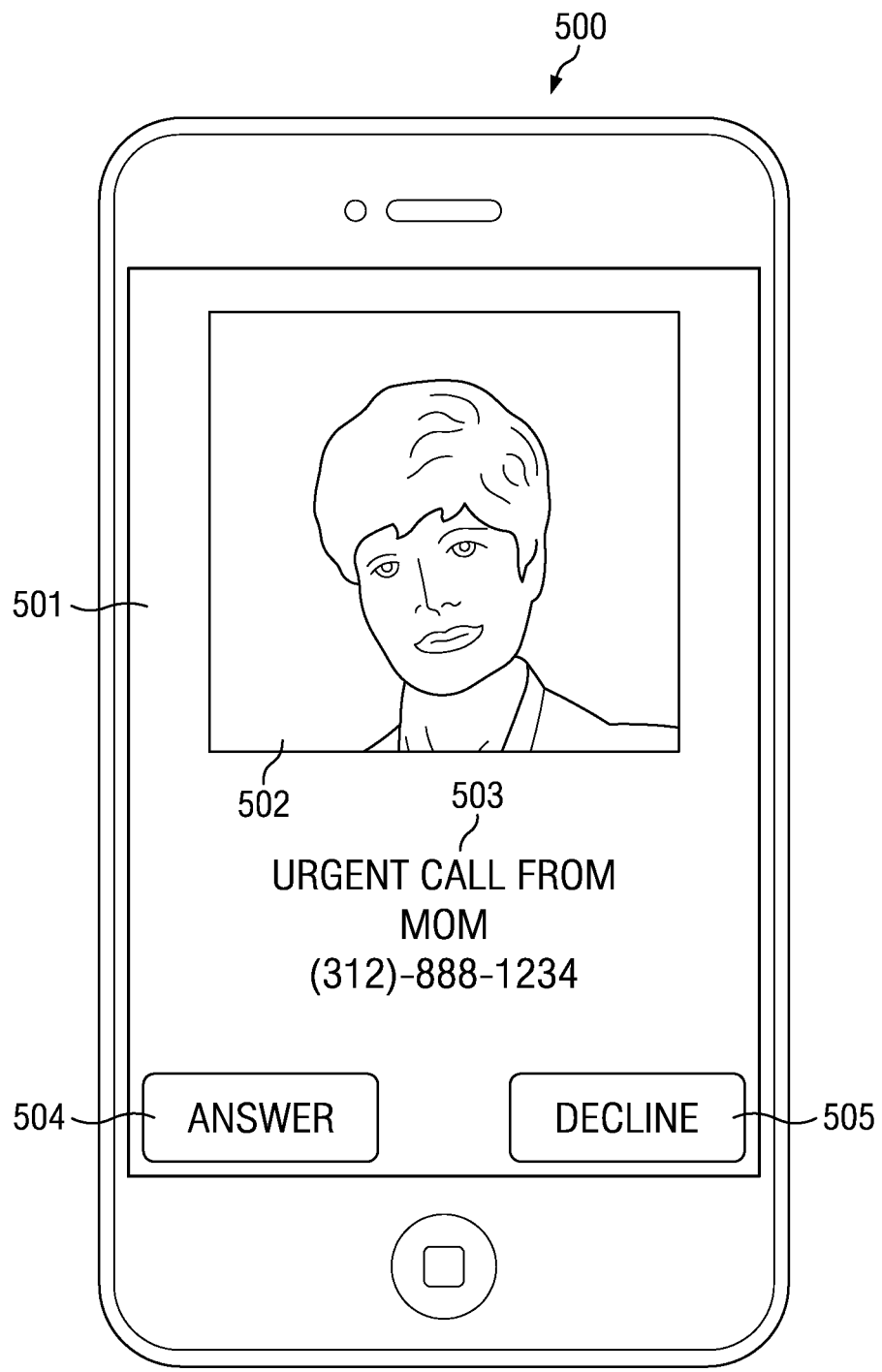
FIGS. 5 and 5A illustrate an example interface displayed to a user receiving high-urgency communications

FIG. 5 illustrates an example incoming call screen in accordance with one embodiment of the invention. FIG. 5 depicts, similar to FIG. 4, mobile device 500 having a display 501. When receiving a call, display 501 displays a profile picture 502 of the incoming caller, and answer key 504, and a decline or ignore key 505. Typically, a regular call also includes an indicator that displays the calling party name and number. In particular embodiments, when a call is urgent, an urgency indicator 503 is also displayed. In particular embodiments, an urgent call changes the background of display 501 to a different color, such as bright red, to indicate urgency. In particular embodiments, mobile device 500's settings may be adjusted to special "urgent call settings. For example, when receiving an urgent call, mobile device 500 may increase the ringer volume to the maximum volume, or turn on vibrate mode. In particular embodiments, the urgency ringer mode overrides any default or current ringer settings of mobile device 500. In particular embodiments, mobile device 500 plays a different ring tone when receiving an urgent call. In particular embodiments, mobile device 500 flashes display 501 on and off to indicate an urgent call. Other variations are easily envisioned by one of ordinary skill in the art. This disclosure contemplates any suitable mechanism of alerting a user of a mobile device that he or she is receiving an urgent communication.

Figure 5A:
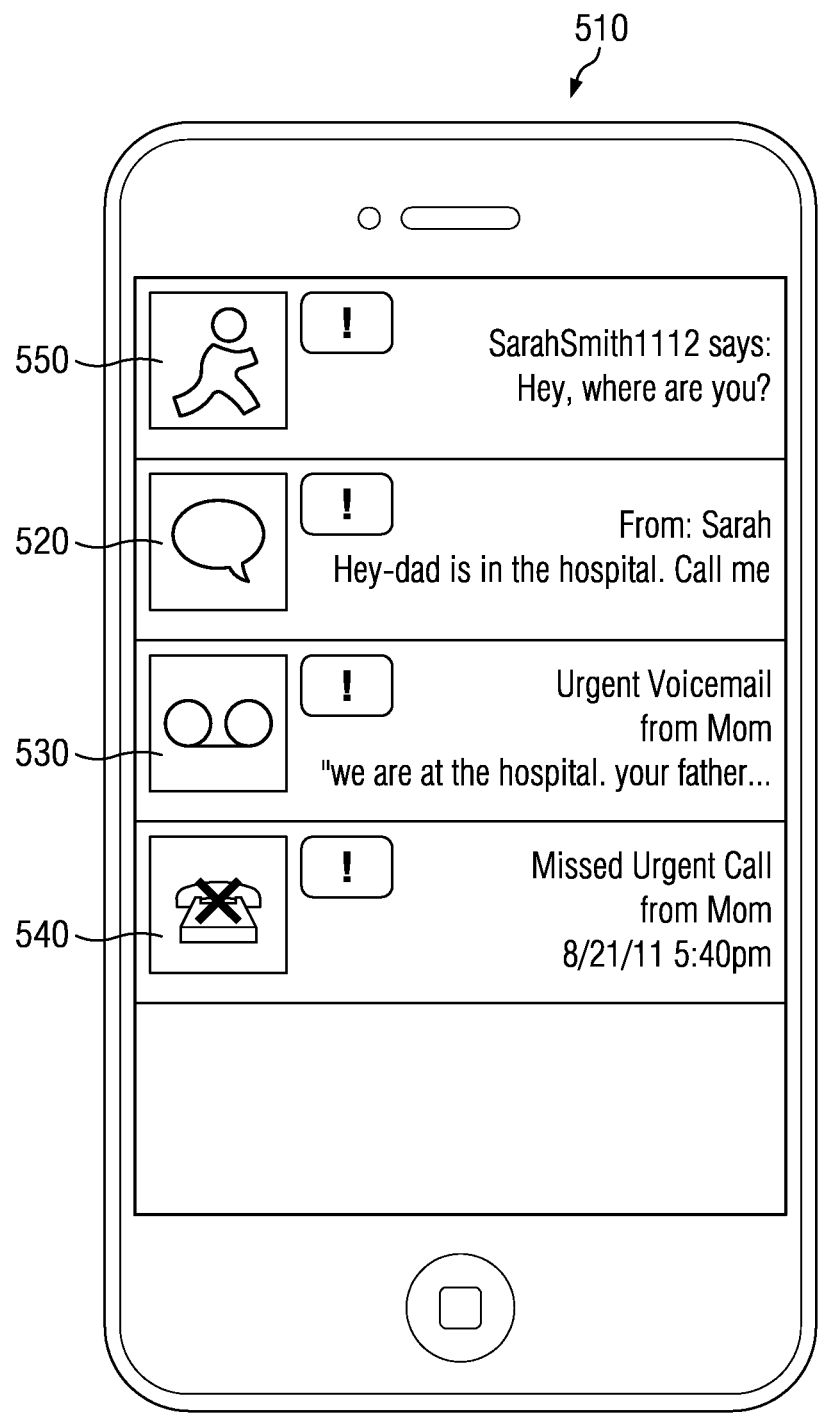

FIG. 5A illustrates an example incoming communication display for a series of urgent communications in accordance with one embodiment of the invention. Mobile device 510 displays a series of urgent communications 520-550 for display to the user. In particular embodiments, urgency may be explicitly stated by the sender, or, as discussed below, implicitly determined by the social networking system or the receiving mobile device. Regardless of how urgency is determined, FIG. 5A depicts an example user display on mobile device 510 for a series of urgent communications across disparate communications channels. Missed call indicator 540 alerts the user of mobile device 510 that he or she missed a call from a contact called "Mom" at 5:40 PM. Missed call indicator may include the term "urgent", an icon, a particular color, and the like. This disclosure contemplates any suitable method of alerting a user of an urgent communication. As a result of the missed urgent call, in this example, the contact "Mom" left a voicemail on the user of mobile device 510's voicemail box. Voicemail indicator 530 alerts the user of the urgent voicemail. In particular embodiments, a portion of transcribed voicemail text may be optionally displayed in voicemail indicator 530. Text message indicator 520 similarly alerts the user of an urgent received text message, and instant message indicator 550 alerts the user of an urgent instant message. In particular embodiments, a user receives a push notification for every urgent communication, and is shown as an icon in a notifications area of mobile device 510 display. In particular embodiments, clicking an urgent notification icon brings up a list of urgent messages as depicted in FIG. 5A. In particular embodiments, urgent communications are immediately displayed to the user regardless of what the user is doing with mobile device 510. In particular embodiments, urgent communications are shown in a conversations view of all communications in the same manner as any other conversation. In particular embodiments, urgent communications are moved to the top of the conversations view.

In particular embodiments, each user may designate, via a graphical user interface on their client device 140, or via a web interface hosted by the social networking system, whether to permit any particular contact to explicitly designate a communication as "urgent." For example, a user may find that his or her mother utilizes the "call urgent" function regardless of the content of the conversation. Instead of repeatedly "downgrading" the incoming urgent communication, the user may simply revoke the explicit urgency privilege for his or her mother.

Figure 6:
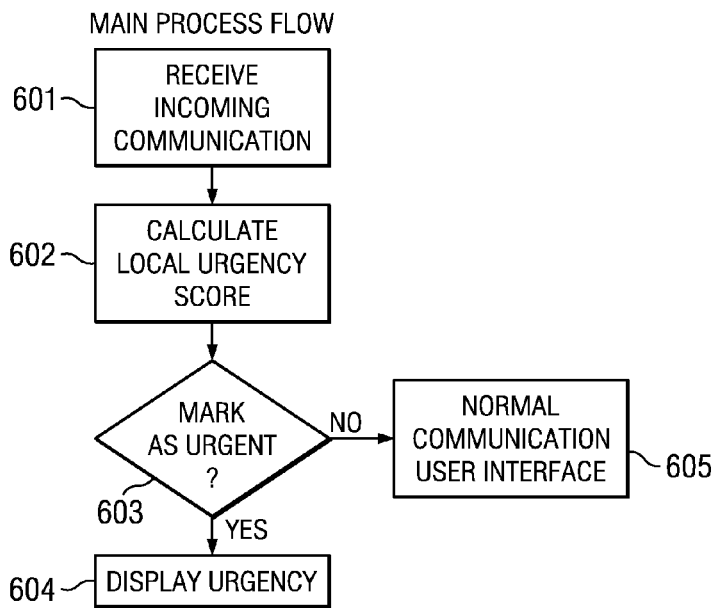
FIG. 6 illustrates an example method of calculating an displaying the urgency of an incoming communication on a mobile device.
Figure 7:
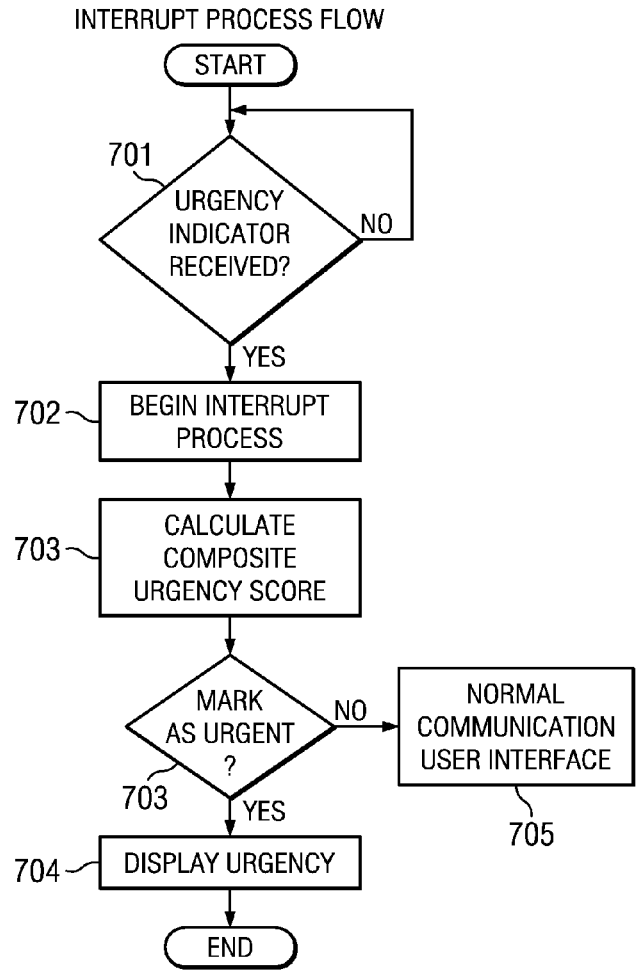
FIG. 7 illustrates an example interrupt process for calculating and displaying the urgency of an incoming communication on a mobile device upon receiving an urgency indicator from a server.

FIGS. 6 and 7 illustrate an example method of determining the urgency of an incoming communication on a receiving device, such as mobile device 140A in FIG. 3. FIG. 6 illustrates the main process flow, which may be interrupted at any time by the interrupt process flow of FIG. 7. As seen in FIG. 7, once the main process is interrupted by the interrupt, the interrupt process completes and both processes terminate; mobile device 140A does not return to the exit point of the main process after the interrupt process completes.

At Step 600, the main process flow begins and awaits an incoming communication. At Step 601, mobile device 140A receives an incoming communication. As previously discussed, an incoming communication may be over any suitable communications channel. The incoming communication may be through the packet-switched or circuit-switched portion of the wireless network serving mobile device 140A. For didactic purposes this description assumes the incoming communication is a circuit-switched voice call.

At Step 602, mobile device 140A calculates a local urgency score for the incoming communication. This urgency score may be purely implicit; the process of FIG. 6 operates on mobile device 140A even when it has not received an urgency indicator through the notification channel. Mobile device 140A may utilize locally stored data, such as relationships stored in a locally stored contacts database, call log data, and the current date/time, to calculate a local urgency score. For example, a number of repeated calls (or other communications) from the same contact within a predefined period of time, such as one hour, may increase the urgency score of the incoming communication. If the same contact calls repeatedly, or initiates multiple communications to mobile device 140A such as calling, texting, emailing, etc. over a short amount of time, mobile device 140A may increase the urgency score of the incoming call or communication. As another example, the date or time of the incoming communication may affect the urgency score. The fact that a call or communication is received at an irregular hour, such as late at night, may cause mobile device 140A to increase the urgency score for the incoming communication.

In particular embodiments, mobile device 140A utilizes any relationship information stored in its memory as a factor in calculating the local urgency score. For example, if a large number of contacts of a group labeled "family" call within a predetermined period of time, mobile device 140A may increase the urgency score for any incoming communication from contacts in that group. In particular embodiments, mobile device 140A dependent on the total frequency of communication between mobile device 140A and a particular contact. As an example, in one embodiment, contacts who are frequently in communication with mobile device 140A may have their communications' urgency scores increased; mobile device 140A may infer that if the user communicates frequently with a particular contact, communications from that contact are more likely to be urgent or important. Alternatively, infrequent communications may also indicate urgency. For example, if the user of mobile device 140A has hardly, if ever, received a call from a particular contact, a communication from that contact, particularly at a strange time or date, has a greater probability of being an urgent call. In particular embodiments, mobile device also adjusts the urgency score based on the type of communication. For example, in one embodiment voice calls may be weighted higher than text messages, which may be weighted higher than emails, which may be weighted higher than instant messages, which may be weighted higher than video chats. This disclosure contemplates any suitable method of weighting urgency scores based on the type of incoming communication.

In particular embodiments, mobile device 140A maintains a historical log for each of the contacts or numbers stored in mobile device 140A containing the date and time of each received communication. Analysis of this log can assist mobile device 140A to identify when a call is irregular for a given contact, hence increasing the call's urgency score. For example, if mobile device 140A, though analysis of the stored historical log, determines that the contact "Mom" calls mobile device 140A every Sunday, it may increase the urgency score for any communication received from "Mom" on days other than Sundays. Techniques for pattern analysis of the stored historical log are well-known in the art, such as association rule learning or the fp-growth algorithm. As a converse example, if mobile device 140A determines that a particular number, or an unknown number, calls in a predictable pattern, such as every Monday at 9 AM, mobile device may decrease the urgency score for statistically predictable or regular calls. In particular embodiments, the type of communication is also taken into account in the historical log. For example, if the user of mobile device 140A and a particular contact primarily or almost exclusively communicate via text message, mobile device 140A may increase the urgency score for an incoming call from that particular contact.

In particular embodiments, mobile device 140A applies special handling for text communications, such as instant messages, text messages, email, and voicemails transcribed via speech-to-text algorithms. In particular embodiments, mobile device 140A looks for key words in text communications that may increase the local implicit urgency score. For example, messages that contain the word "emergency", "hospital", "police", "jail", or the like may increase the implicit urgency of a given communication. Conversely, certain words or phrases may decrease the implicit urgency score. For example, words such as "opportunity", "raffle", "courtesy call", etc. may indicate telemarketer spam. This disclosure contemplates any suitable method of text processing to influence the locally calculated implicit urgency score.

In particular embodiments, mobile device 140A may perform post-processing on voicemails to detect the stress level of the speaker. Techniques for detecting stress in voice samples are well-known in the art, and are not described in detail in this disclosure. In particular embodiments, a high degree of vocal stress in a voicemail increases the implicit urgency score of the voicemail, and, in particular embodiments, the missed or ignored call generating the voice mail. Methods of calculating a local urgency score are not limited to the disclosed examples; any combination of the aforementioned or additional factors may be utilized to locally calculate an implicit urgency score.

In particular embodiments, a user may provide a feedback mechanism by "downvoting or "downgrading" a particular communication. For example, mobile device 140A may provide a user selectable element that allows the user to downgrade the importance of a call. These downgrades are stored locally in a log for the particular contact or number, and accessed to calculate the urgency score for all incoming communications from that contact. For example, a user may, before, during, or after reception, a call from a telemarketer. In particular embodiments, even though the user does not have a stored contact for the telemarketer, the downgrade is stored in a log for the particular number. This explicit downgrade may be weighted and/or subtracted from the implicit urgency score. If the user downgrades communications from that particular number enough, in particular embodiments, mobile device 140A may automatically ignore the call, block the number, disable the ringer, or any other communications handling. In particular embodiments, the user may provide a feedback mechanism to the social networking system accessible for all other users, or, in particular embodiments, friends of the user, by reporting spam or malicious calls to the social networking system through the open connection to the social networking system servers. Thus in particular embodiments, a member of a social networking service may perform a "reverse lookup" on an incoming call, regardless of whether the call originates from another member of the social networking system or a landline unassociated with a member of the social networking system, and the social networking system may return that the caller has been downvoted multiple times or reported as spam or telemarketing. The user may then simply decline the call. In particular embodiments, the dialer application, upon receiving this information, simply blocks the call without any user intervention. For more information on performing a reverse lookup utilizing information from a social networking system, please see commonly-owned U.S. patent application Ser. No. 13/214,940, entitled, "Social Caller ID With Reverse Look-Up," herein fully incorporated by reference.

At Step 603, mobile device 140A determines the urgency based upon the local urgency score. In particular embodiments, a communication is marked as "urgent" if the urgency score exceeds a predetermined threshold. In particular embodiments, there may be only two states: urgent, or normal. In particular embodiments, there may be three states, spam, normal, and urgent. Although this disclosure describes a finite number of states, the urgency indicator may have any number of states. For example, the urgency may be a gradient from 1-100, and represented by changing the color of the communication in a continuous spectrum from green to yellow, to orange, to red. This disclosure contemplates any number of urgency states and methods of displaying the urgency.

At Step 604, if mobile device 140A has determined that the incoming communication is urgent, it displays the urgency icon, or other means of display a high urgency communication, to the user, as depicted by FIGS. 5 and 5A.

The interrupt process of FIG. 7 may be triggered any time an urgency indicator is received by mobile device 140A. The urgency indicator may contain both an explicit portion and an implicit portion. The explicit portion is merely whether the transmitting user has marked the communication as "urgent." The implicit portion is calculated by the social networking system based on information transmitted to the social networking system. As previously stated, in particular embodiments, the transmitting mobile device transmits an urgency indicator including information about the mobile device regardless of whether the user selects the urgency indicator or not. The information transmitted may include data leveraged by the social networking system to implicitly determine urgency. For example, the information may include the calling party's number (or other identifier, such as the email address, chat handle, or any other third-party identifier utilized in the communication), the location of the transmitting mobile device (determined by GPS or TDoA triangulation), and the unique identifiers for the social networking user account associated with both the transmitting and receiving device.

Upon receiving this information, the social networking server may calculate a an implicit urgency score based upon the information. The social networking system may base this implicit urgency score on any number of factors. For example, the social networking system may perform a reverse lookup on the number to determine if a large number of its users have downgraded communications from that number, or if any users have reported the number as spam or telemarketing. As previously stated, the social networking system may perform this call blocking or call downgrading even if the originating caller does not transmit any information to the social networking system; the called device may transmit incoming caller information to the social networking system, and the social networking system may perform a reverse lookup of the number to determine if other users have reported the number as spam, telemarketing, or downgraded the urgency of the number. If so, the social networking system may reduce the implicit urgency score. As another example, the social networking system may utilize information from a social graph describing the relationships of its various users and the received social networking identifiers. For example, the social networking system may determine how close the caller and called users are (represented by a "social coefficient") by querying the number of shared connections, number of photos the two users are tagged in together, and the general amount of interaction on the social networking system between the two users. If the two users have a high social coefficient, the server may increase the implicit urgency score for the communication. In particular embodiments, the social networking system assigns a higher implicit urgency score to communications between users who have identified themselves as "family" on the social networking system. In particular embodiments, the social networking system assigns a higher implicit urgency score to communications between users who are listed as "in a relationship" on the social network.

In particular embodiments, the social networking system maintains a log of the previous calls to mobile device 140A. If multiple users who are close in social proximity have communicated with mobile device 140A, the social networking system may assign a higher urgency score to a communication to mobile device 140A originating from one or more of the users close in social proximity. In particular embodiments, the log of previous communications to mobile device 140A includes the location of each transmitting party, and the social networking system assigns a higher urgency value to calls or communications that are originating from a user who is physically located closely to other users who have previously communicated with mobile device 140A within a predetermined window. For example, if four users who are all within a few meters of each other have called mobile device 140A, a fifth communication from a user in physical proximity with the other four users may be assigned a high urgency score.

As another example, the social networking system may utilize the location of the transmitting user and a location database to infer urgency. For example, a call or other communication from a user at a hospital, police station, courthouse, or airport has a higher probability of being an urgent call. This disclosure contemplates any suitable urgency weighting for any suitable location. In particular embodiments, the transmitting user's location and the location information from the transmitting user's profile page may be utilized to calculate the implicit urgency score. For example, the social networking system may compare the transmitting user's current location to the "current city" (indicating the user's city of residence) listed in his or her profile, and increase the implicit urgency score for locations outside of a predetermined distance from his or her city of residence. In particular embodiments, the social networking system assigns a higher implicit urgency score to international calls. This disclosure contemplates any suitable method of adjusting an implicit urgency score based on the location of the transmitting mobile device. Any of the above factors may be utilized by the social networking system to calculate an implicit urgency score. This disclosure contemplates any suitable method of calculating an implicit urgency score. After the social networking system calculates the implicit urgency score, it transmits an urgency indicator, along with the explicit urgency score (generally a 1 or a 0), to the mobile device associated with the called user via the notification channel.

At Step 701, the interrupt process constantly checks if it has received an urgency indicator from the social networking system. Immediately upon receiving an urgency indicator, the mobile device triggers the interrupt process at Step 702, detouring the execution from the process of FIG. 6; regardless of what step the process is executing.

At Step 703, the receiving mobile device calculates a composite urgency score. The composite urgency score is a weighted sum or average of the local urgency score calculated by the receiving mobile device, the explicit urgency score transmitted from the transmitting mobile device and relayed by the social networking system, and the implicit urgency score calculated by the social networking system. In particular embodiments, the explicit urgency score is weighted heavier than the other two scores. Thus, the composite urgency score, U, may be expressed as $C1*TX\_explicit + C2*local\_implicit + C3*server\_implicit - C4*RX\_explicit$, where C1-C4 are coefficients, TX_explicit is whether the transmitting device has explicitly flagged the communication as urgent, local_implicit is the score calculated by the receiving mobile device, and server_implicit is the score calculated by the social networking system. This disclosure contemplates any suitable generation method and weighting of a composite urgency score.

At Step 704, if receiving mobile device 140A has determined that the incoming communication is urgent, it displays the urgency icon, or other means of display a high urgency communication, to the user, as depicted by FIGS. 5 and 5A.

Particular embodiments may include further actions performed by receiving client device 140A. For example, in particular embodiments, if the urgency indicator is received after the user of mobile device 140A has ignored a call, mobile device 140A may alert the user via a ring, vibrate, or other notification, and automatically call back the caller.

In particular embodiments, the social networking system may transmit an urgency indicator to both the called user, as well as users within a predetermined geographic or social distance from the called user. For example, if the called user is in the same geographic location (e.g., a restaurant or sporting event) as other members of the social networking system, the social networking system may transmit an urgency indicator to the members who are with the called user. Doing so increases the probability that the called user is notified of the urgent communication. In particular embodiments, the "indirect" urgency notification transmitted to the users near the called party may be a push notification with no personal details, for example, a text message or push notification stating, "[Called party name] has received an urgent communication" and requesting the user to notify the called party. In particular embodiments, the social coefficient may also be used to determine whether to transmit an indirect notification to a contact of the called user; users with higher social coefficients are more likely to relay the message to the called user. In particular embodiments, a combination of geographic and social distance may be utilized to determine whether to transmit an indirect urgency notification to a contact of the called user. This disclosure contemplates any suitable method of determining recipients of indirect urgency notifications, and any suitable notification method.

Figure 8:
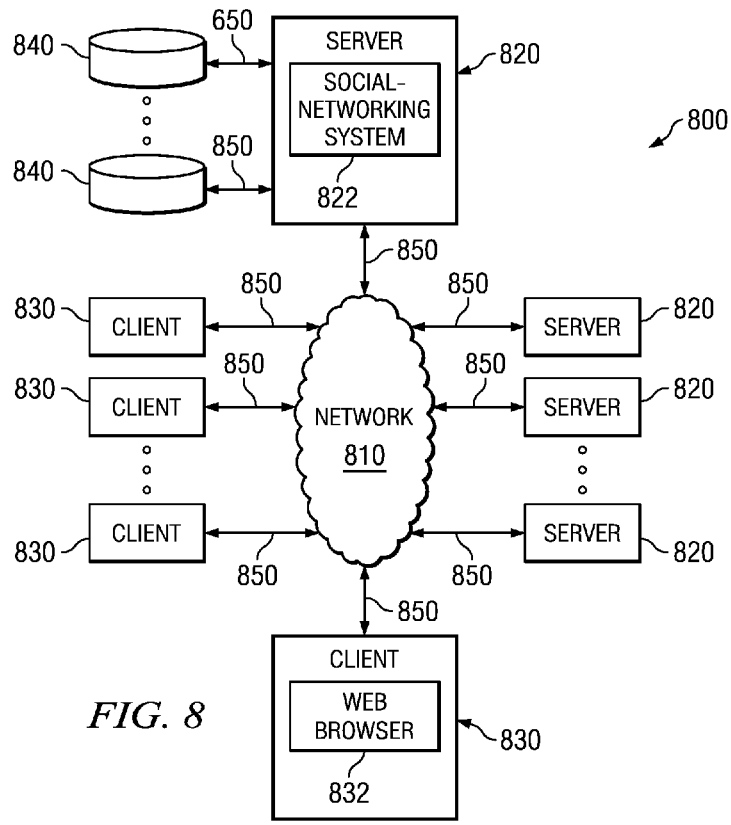
FIG. 8 illustrates an example network environment.

Particular embodiments may be implemented in a network environment. FIG. 8 illustrates an example network environment 800. Network environment 800 includes a network 810 coupling one or more servers 820 and one or more clients 830 to each other. In particular embodiments, network 810 is an intranet, an extranet, a virtual private network (VPN), a local area network (LAN), a wireless LAN (WLAN), a wide area network (WAN), a metropolitan area network (MAN), a portion of the Internet, or another network 810 or a combination of two or more such networks 810. This disclosure contemplates any suitable network 810.

One or more links 850 couple a server 820 or a client 830 to network 810. In particular embodiments, one or more links 850 each includes one or more wireline, wireless, or optical links 850. In particular embodiments, one or more links 850 each includes an intranet, an extranet, a VPN, a LAN, a WLAN, a WAN, a MAN, a portion of the Internet, or another link 850 or a combination of two or more such links 850. This disclosure contemplates any suitable links 850 coupling servers 820 and clients 830 to network 810.

In particular embodiments, each server 820 may be a unitary server or may be a distributed server spanning multiple computers or multiple datacenters. Servers 820 may be of various types, such as, for example and without limitation, web server, news server, mail server, message server, advertising server, file server, application server, exchange server, database server, or proxy server. In particular embodiments, each server 820 may include hardware, software, or embedded logic components or a combination of two or more such components for carrying out the appropriate functionalities implemented or supported by server 820. For example, a web server is generally capable of hosting websites containing web pages or particular elements of web pages. More specifically, a web server may host HTML files or other file types, or may dynamically create or constitute files upon a request, and communicate them to clients 830 in response to HTTP or other requests from clients 830. A mail server is generally capable of providing electronic mail services to various clients 830. A database server is generally capable of providing an interface for managing data stored in one or more data stores. In particular embodiments, a social-networking system 822, implementing a social-networking website, may be hosted on one or more servers 820.

In particular embodiments, one or more data storages 840 may be communicatively linked to one or more severs 820 via one or more links 850. In particular embodiments, data storages 840 may be used to store various types of information. In particular embodiments, the information stored in data storages 840 may be organized according to specific data structures. In particular embodiments, each data storage 840 may be a relational database. Particular embodiments may provide interfaces that enable servers 820 or clients 830 to manage, e.g., retrieve, modify, add, or delete, the information stored in data storage 840.

In particular embodiments, each client 830 may be an electronic device including hardware, software, or embedded logic components or a combination of two or more such components and capable of carrying out the appropriate functionalities implemented or supported by client 830. For example and without limitation, a client 830 may be a desktop computer system, a notebook computer system, a netbook computer system, a handheld electronic device, or a mobile telephone. This disclosure contemplates any suitable clients 830. A client 830 may enable a network user at client 830 to access network 830. A client 830 may enable its user to communicate with other users at other clients 830.

A client 830 may have a web browser 832, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client 830 may enter a Uniform Resource Locator (URL) or other address directing the web browser 832 to a server 820, and the web browser 832 may generate a Hyper Text Transfer Protocol (HTTP) request and communicate the HTTP request to server 820. Server 820 may accept the HTTP request and communicate to client 830 one or more Hyper Text Markup Language (HTML) files responsive to the HTTP request. Client 830 may render a web page based on the HTML files from server 820 for presentation to the user. This disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Figure 9:
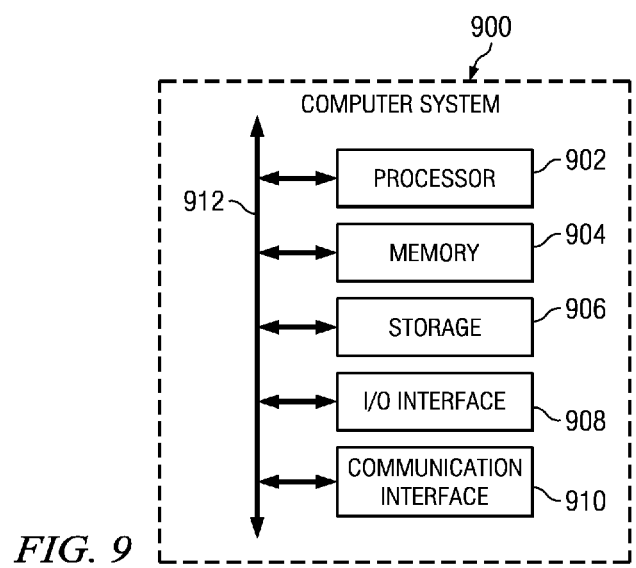
FIG. 9 illustrates an example computer system.

Particular embodiments may be implemented on one or more computer systems. FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 900 may include one or more computer systems 900; be unitary or distributed; span multiple locations; span multiple machines; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include an HDD, a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 902 (such as, for example, one or more internal registers or caches), one or more portions of memory 904, one or more portions of storage 906, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA, C, or C++. In particular embodiments, software is expressed in Hyper Text Markup Language (HTML), Extensible Markup Language (XML), or other suitable markup language.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
receiving, at a second computing device, a communication from a first computing device;
by the second computing device, calculating an urgency score for the communication, wherein the urgency score is calculated based at least in part on downgrade information associated with the first computing device;
determining, based on the urgency score, whether to flag the communication as urgent; and
in response to a positive determination:
notifying a user of the second computing device of the communication;
receiving, from the user, an input to reduce the urgency of the communication; and
in response to the input, updating the downgrade information associated with the first computing device;
wherein: the urgency score is a composite score comprising a local implicit urgency value calculated by the second computing device; and
the local implicit urgency value is calculated by the second computing device based on a number of communications from the first computing device received in a predetermined temporal window.

2. The method of claim 1, wherein the local implicit urgency value is calculated by the second computing device based on a date or time of the communication.

3. The method of claim 1, wherein the downgrade information associated with the first computing device is stored in a log.

4. The method of claim 1, further comprising:
 receiving, from a third computing device, an explicit urgency value and a server-side implicit urgency value; and
 calculating the urgency score based in part on the received explicit urgency value and server-side implicit urgency value.

5. The method of claim 4, wherein the urgency score is a composite score based at least on the explicit urgency value, the server-side implicit urgency value, and a local implicit urgency value calculated by the second computing device.

6. A non-transitory, computer-readable media comprising instructions operable when executed by one or more computing devices to:
 receive, at a second computing device, a communication from a first computing device;
 calculate an urgency score for the communication, wherein the urgency score is calculated based at least in part on downgrade information associated with the first computing device;
 determine, based on the urgency score, whether to flag the communication as urgent; and in response to a positive determination:
 notify a user of the second computing device of the communication;
 receive, from the user, an input to reduce the urgency of the communication;
 and
 in response to the input, update the downgrade information associated with the first computing device stored in the log;
 wherein:
  the urgency score is a composite score comprising a local implicit urgency value calculated by the second computing device; and
  the local implicit urgency value is calculated by the second computing device based on a number of communications from the first computing device received in a predetermined temporal window.

7. The media of claim 6, wherein the local implicit urgency value is calculated by the second computing device based on a date or time of the communication.

8. The media of claim 6, wherein the downgrade information associated with the first computing device is stored in a log.

9. The media of claim 6, further comprising instructions operable when executed by one or more computing devices to:
 receive, from a third computing device, an explicit urgency value and a server-side implicit urgency value; and
 calculate the urgency score based in part on the received explicit urgency value and server-side implicit urgency value.

10. The media of claim 9, wherein the urgency score is a composite score based at least on the explicit urgency value, the server-side implicit urgency value, and a local implicit urgency value calculated by the second computing device.

11. A system comprising:
 one or more processors; and
 a memory coupled to the processors comprising instructions executable by the processors, the processors being operable when executing the instructions to:
 receive, at a second computing device, a communication from a first computing device;
 calculate an urgency score for the communication, wherein the urgency score is calculated based at least in part on downgrade information associated with the first computing device;
 determine, based on the urgency score, whether to flag the communication as urgent; and
 in response to a positive determination:
 notify a user of the second computing device of the communication;
 receive, from the user, an input to reduce the urgency of the communication; and
 in response to the input, update the downgrade information associated with the first computing device stored in the log;
 wherein:
  the urgency score is a composite score comprising a local implicit urgency value calculated by the second computing device; and
  the local implicit urgency value is calculated by the second computing device based on a number of communications from the first computing device received in a predetermined temporal window.

12. The system of claim 11, wherein the local implicit urgency value is calculated by the second computing device based on a date or time of the communication.

13. The system of claim 11, wherein the downgrade information associated with the first computing device is stored in a log.

14. The system of claim 11, wherein the processors are further operable when executing the instructions to:
 receive, from a third computing device, an explicit urgency value and a server-side implicit urgency value; and
 calculate the urgency score based in part on the received explicit urgency value and server-side implicit urgency value.

15. The method of claim 14, wherein the urgency score is a composite score based at least on the explicit urgency value, the server-side implicit urgency value, and a local implicit urgency value calculated by the second computing device.

\* \* \* \* \*